May 12, 1964

J. A. ABBOTT ETAL 3,132,930

FREEZE DRYING SYSTEM

Filed April 13, 1961

INVENTORS
JOHN A. ABBOTT
ERIK THUSE

BY Hans G. Hoffmeister.

ATTORNEY

May 12, 1964 J. A. ABBOTT ETAL 3,132,930
FREEZE DRYING SYSTEM
Filed April 13, 1961 9 Sheets-Sheet 4
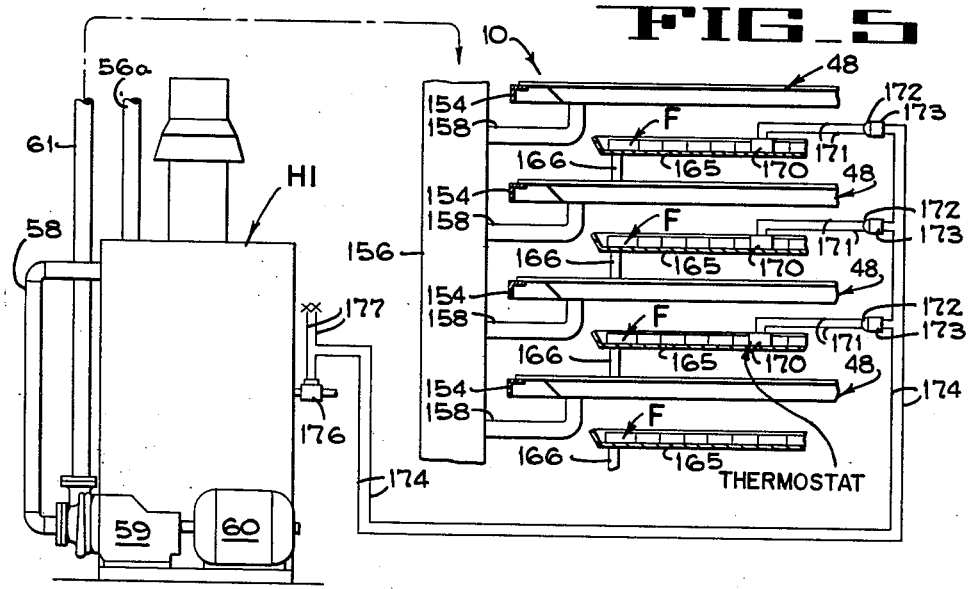
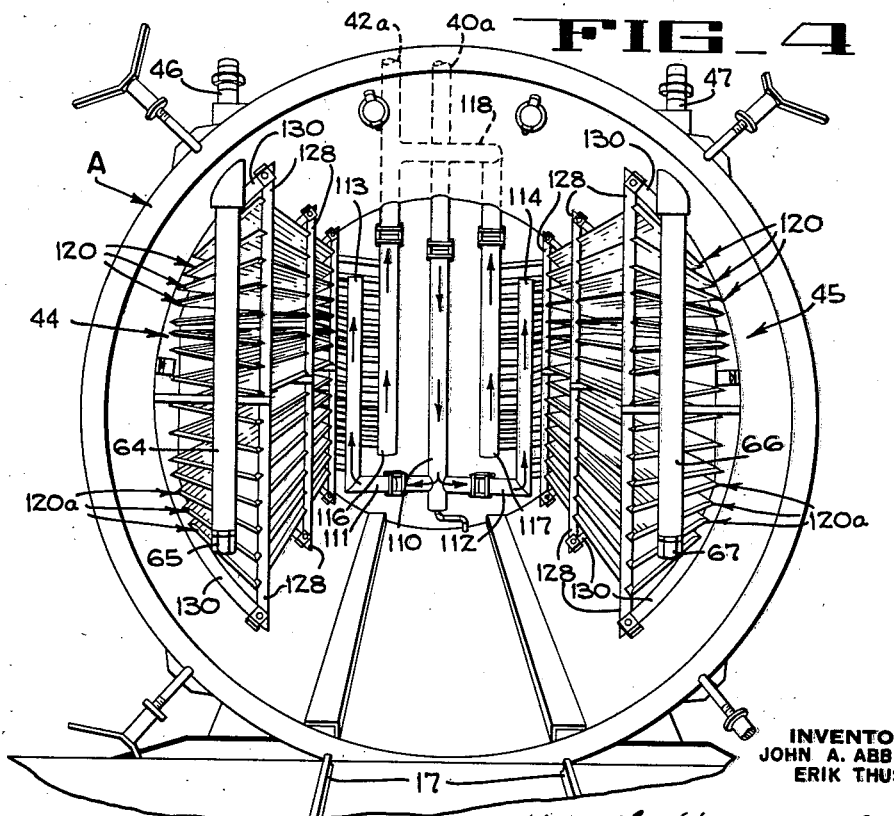
INVENTORS
JOHN A. ABBOTT
ERIK THUSE
BY Hans G. Hoffmeister
ATTORNEY

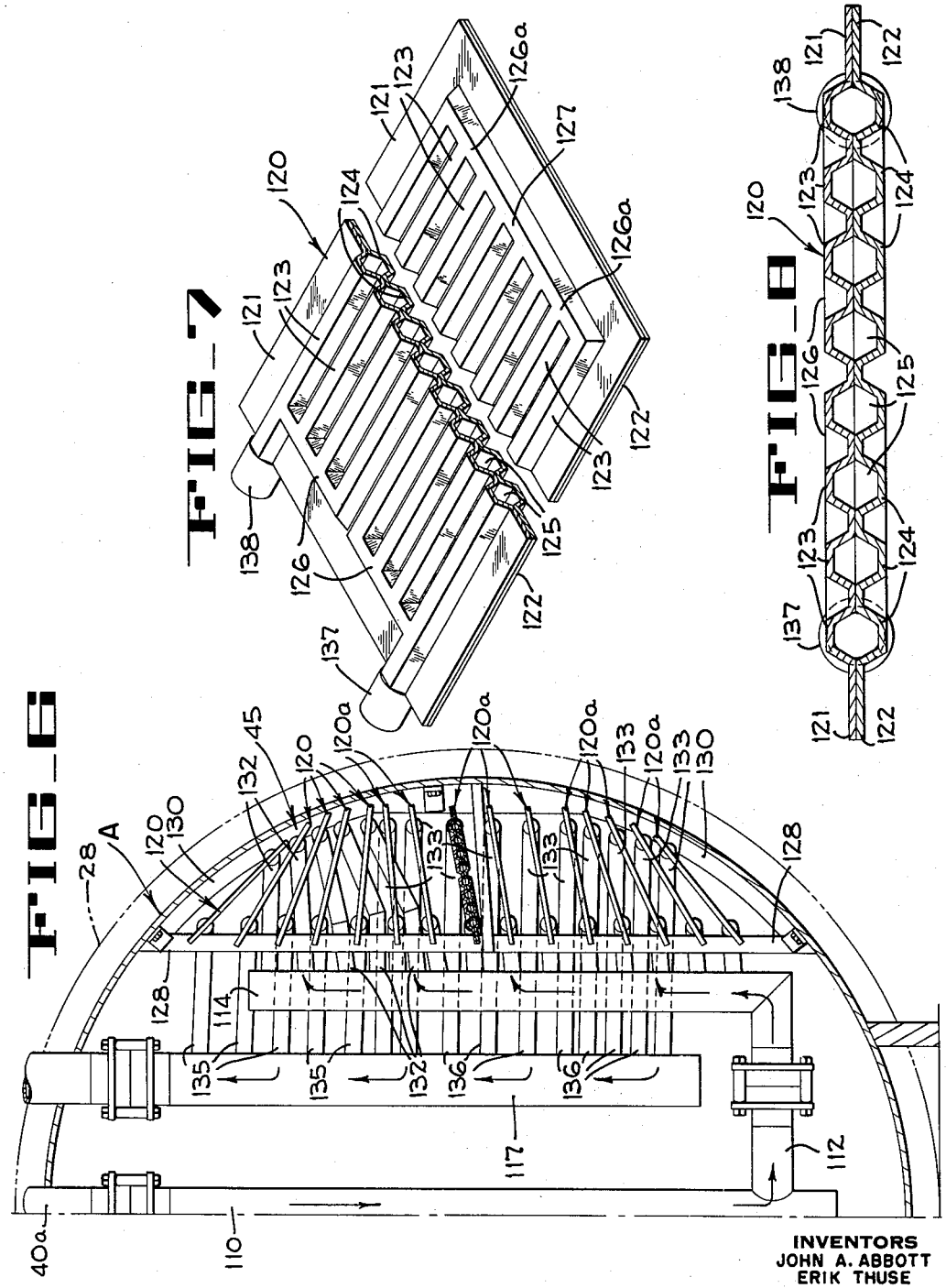

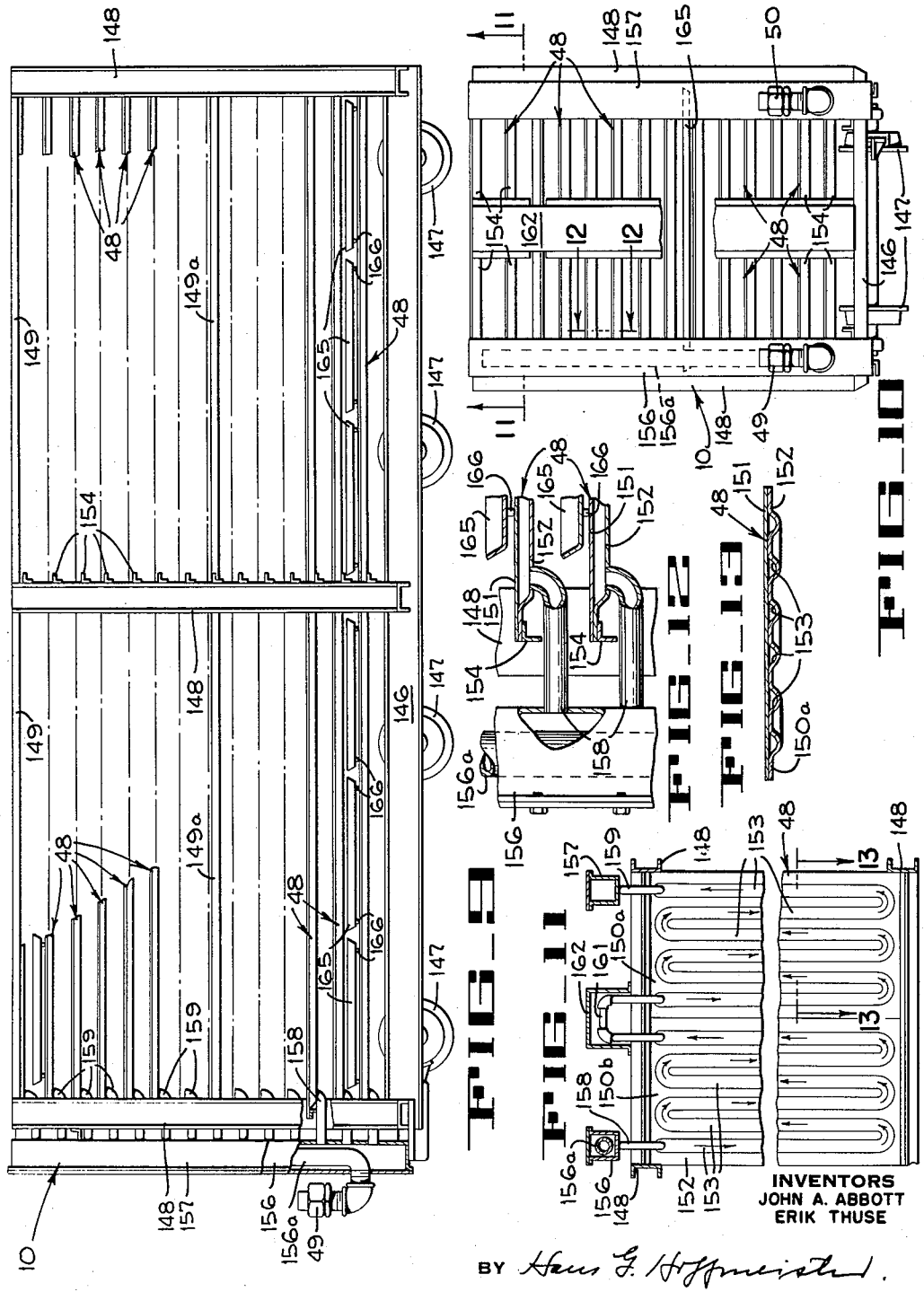

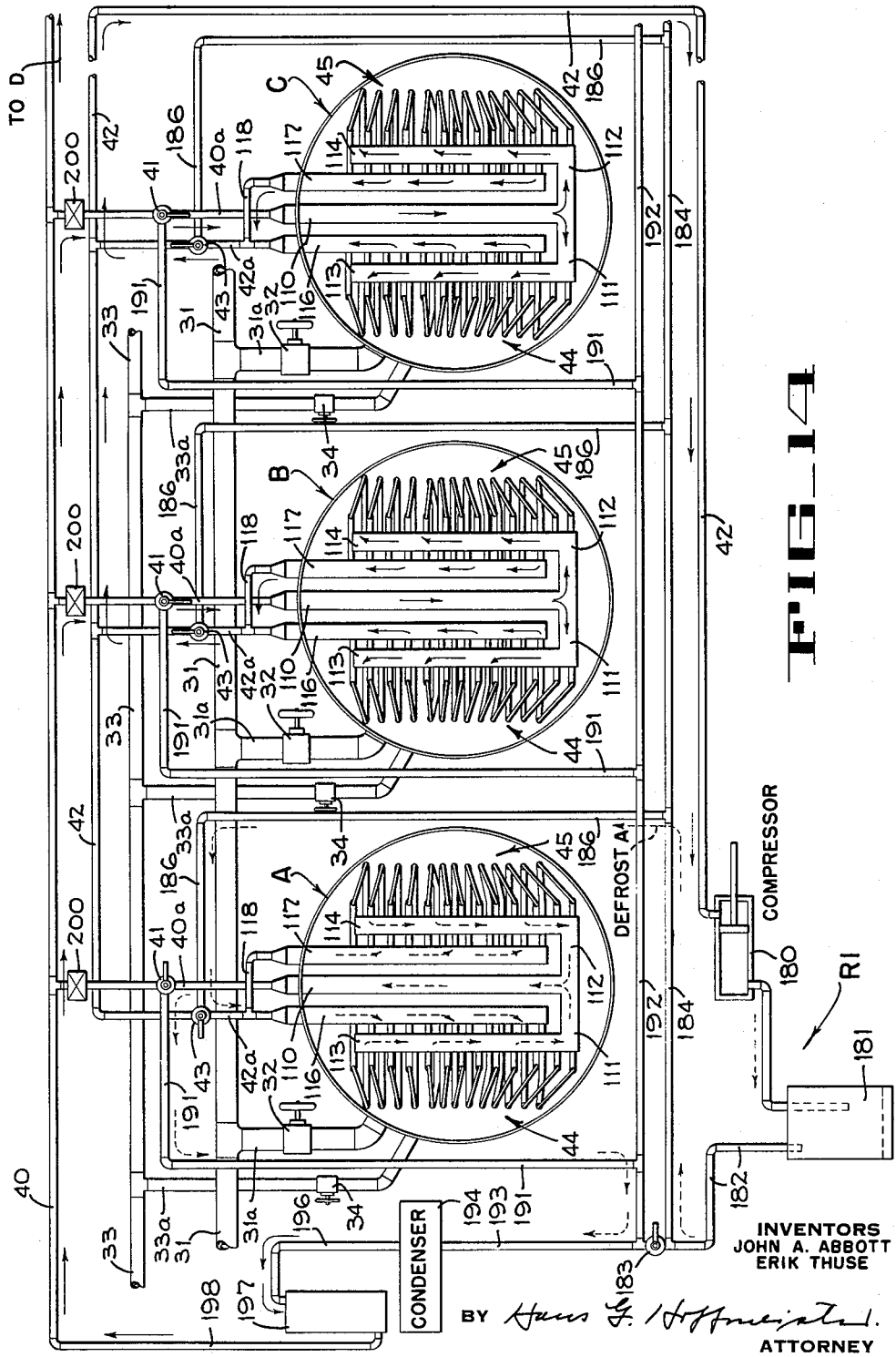

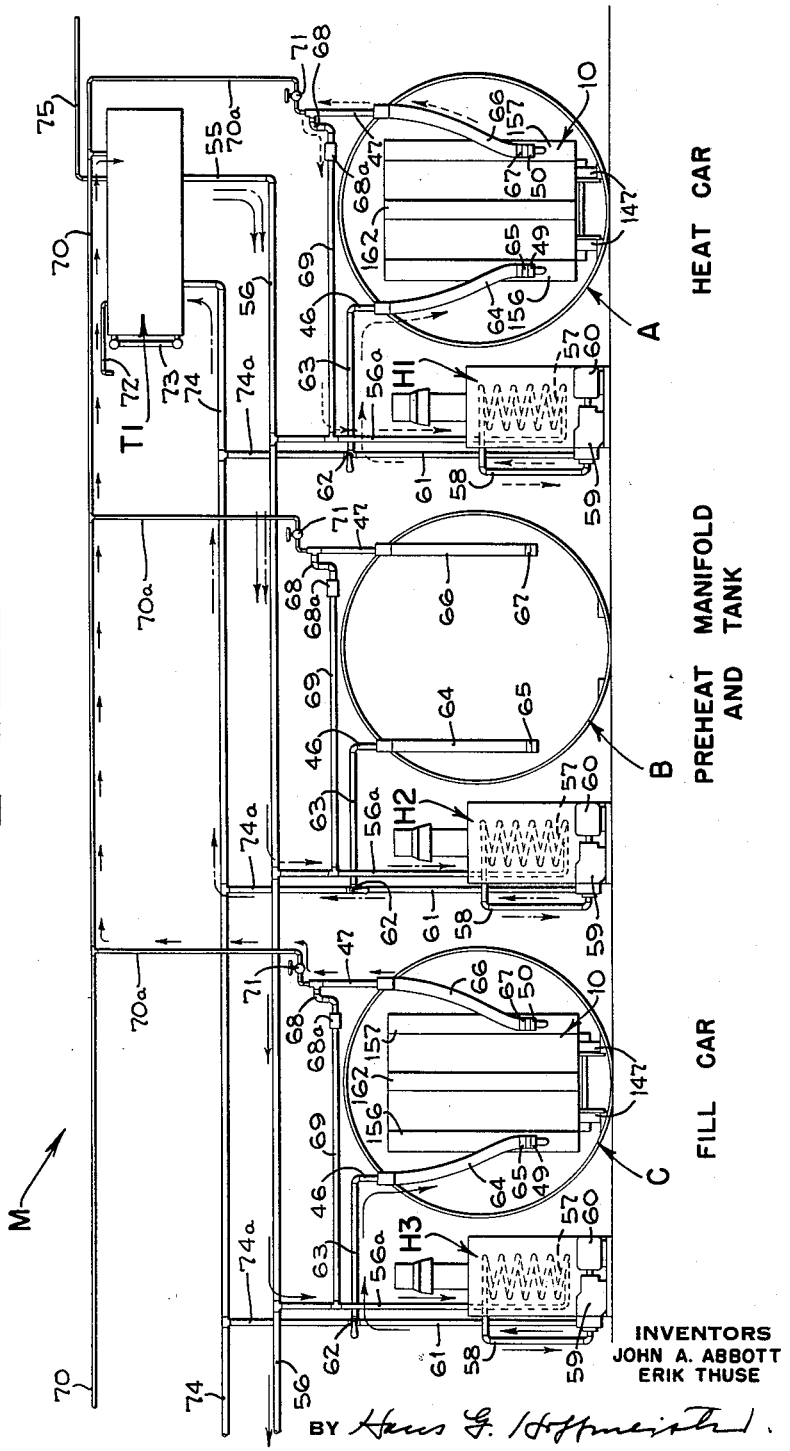

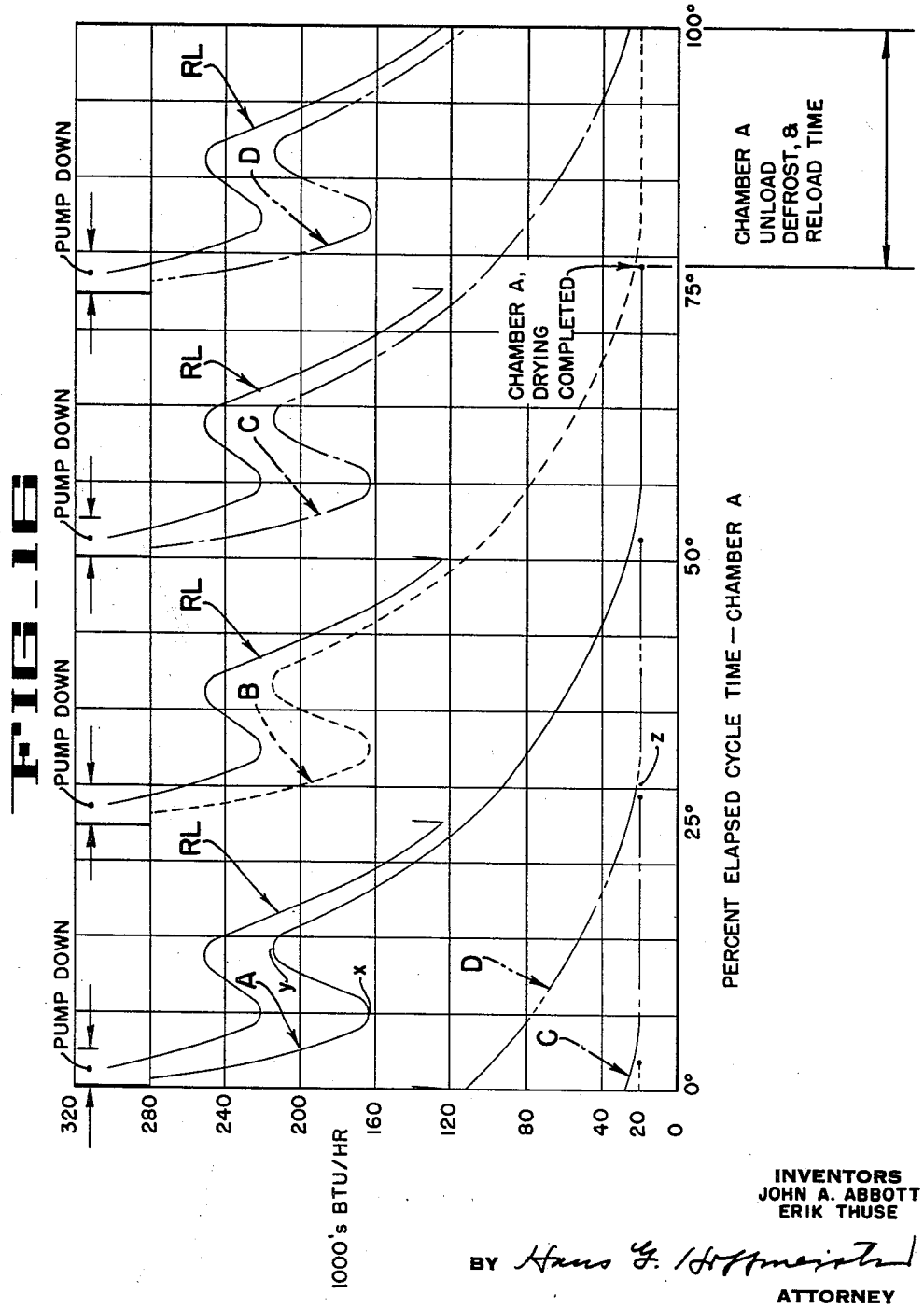

3,132,930
FREEZE DRYING SYSTEM

John A. Abbott, Menlo Park, and Erik Thuse, San Jose, Calif., assignors to FMC Corporation, a corporation of Delaware
Filed Apr. 13, 1961, Ser. No. 102,703
10 Claims. (Cl. 34—92)

This invention relates to freeze drying, and more particularly to freeze drying apparatus wherein the product is placed in a vacuum chamber and heated, and the sublimed water vapor from the product is condensed and frozen into ice particles.

The freeze drying process is particularly adapted for use in subliming ice from frozen articles such as food products or bacteriological products because, except for removal of the water, the basic properties of the products are unchanged by the drying process. The process is carried out in a subatmospheric pressure chamber, such as a vacuum drying chamber, and the water vapor resulting from the sublimation process must be removed to maintain the vacuum in the chamber and to prevent the ice in the frozen product from passing through the liquid stage. Products thus frozen can be reconstituted by the addition of water, and will thereby retain substantially all of their original qualities.

Since a high production freeze drying process of the type described may require that the product be maintained in the vacuum chamber for a considerable period of time, such as 24 hours, the portion of equipment cost charged against the value of the dried product is not insignificant. It is an object of the present invention to reduce the equipment cost chargeable against the product, while maintaining a high production rate.

Briefly, this is accomplished by using a relatively long cylindrical vacuum chamber, a shape that is cheaply fabricated and can be designed to resist crushing at close to the minimum theoretical material cost. In the system of this invention, the product material is loaded on trays and the trays are placed in a long car that has liquid heated hollow shelves for supporting the trays, and heating the product. The loaded car is wheeled into the vacuum chamber. Vapor condenser plates occupy side sectors of the chamber at each side of the car, thereby providing maximum utilization of otherwise waste chamber space. As will be seen presently, other economies are effected by the use of multiple chamber installations.

Another object of the invention is to require a minimum vapor pressure drop as sublimed vapor flows from the product being dried to the condenser plates in the vacuum chamber. This is accomplished by having the condenser plates arranged at each side of the chamber with their inner edges lying in vertical planes disposed close to the corresponding edges of the food trays on the car.

A further object is to make possible optimum use of the available space in a cylindrical vacuum chamber for the condensing plates, coupled with efficient circulation of refrigerant through the plates. Briefly, this is accomplished by mounting the sets of plates at each side of the chamber in longitudinally extending vertically spaced units, the plates in each set being divergent to form a fan-shaped assembly, with refrigerant inlet connections being made to the lower edges of all the plates.

A further object is to facilitate the defrosting of the condenser plates in the vacuum chamber. This is accomplished by using a removable car, as described above, which provides operator access to the vacuum chamber. Furthermore, means are provided to internally heat the condenser plates by hot gaseous refrigerant so that when the car is removed, the vacuum chamber can be entered, and the plates flushed free of defrosted ice crystals with a hose.

Another object of the present invention is to make it possible to provide heated liquid in the shelves of the product carrying car when desired, as well as to make it possible to fill the product carrying shelves with cold liquid when desired. It is a feature of this invention that the car can be alternately supplied with heated and cooled liquid at a minimum heating cost. Briefly, this is accomplished by providing a warm and a cold liquid tank or reservoir. The procedure of the invention is to transfer the hot liquid from the car shelves to the warm liquid reservoir at the end of the drying cycle, when the car has been wheeled to a product unloading or drying room. In addition, when a car is in the cold or loading room, its shelves can be filled with circulating cold liquid supplied from a cold tank or reservoir. This cools down the car for loading with the frozen product.

In accordance with the present invention means are also provided to purge or blow out both the hot and the cold liquid from the car shelves into the respective hot and cold liquid storage tanks, at the desired stage in the cycle.

Still another object of the present invention is to provide maximum utilization of the refrigeration and vacuum pump installations. Briefly, this is accomplished by connecting a number of freeze drying chambers and their internal vapor condensers in tandem, there being a single main refrigeration unit and both a heavy duty and a lighter duty vacuum pump unit, connected to the chambers by suitable valves. The heavy duty or pump-down vacuum pump unit is connected to each chamber at the start of the cycle, to remove the air trapped in the chamber for rapidly pulling down the vacuum, whereupon the lighter duty or holding unit is connected to the chamber to maintain the previously established vacuum. A result of this system is an averaging out of the power requirements of both the refrigeration and the vacuum units, producing maximum efficiency in terms of power consumption and equipment sizes and cost. Also, the capacity of the refrigeration unit required to operate a number of units need not be made much greater than that required for a single unit.

A further object of the present invention is to precisely control the temperature of the product during freeze drying, when the trays are not supported directly on the heated shelves and hence are not at the shelf temperature. If the surface temperature of the dried portion of the product is maintained too low, the cycle time is unduly prolonged, and if the surface temperature of the dried portion is permitted to become too high, previously dried portions of the product may be scorched or damaged. Also, it is important that the heating process be stopped soon after the drying process is complete. Temperature control by thermo-couples embedded in the product may result in controlling from an atypical product area. Also, since the thermo-couple wires are heat conductors, they locally melt the very portion of the frozen product the temperature of which is being measured.

In accordance with the present invention, it has been found that satisfactory temperature control is attained by mounting thermostat switches directly on some of the product trays, with the thermostats being connected in series and controlling the heat source for the heating liquid circulated in the hollow shelves that support the trays. As soon as one tray reaches the temperature at which the thermostats are set, the heat is turned off automatically and it is not turned on again until there are no trays at a temperature above the control point temperature. This precludes scorching of the product and makes possible excellent control of product drying time.

Another object of the invention is to facilitate defrosting of the condenser plates in the vacuum chambers while consuming minimum power in the form of heat loss. This is accomplished by diverting hot compressed gaseous refrigerant from the line between the refrigerant compressor and the refrigerant condenser, and passing the hot refrigerant gas through the vapor condenser plates of the unit to be defrosted, by the use of suitable valving. This defrosting has no effect on the refrigeration of the other units, and makes use of heat that would otherwise be lost.

The manner in which these and other objects of the present invention may be obtained will be apparent from the following detailed description of the invention taken in conjunction with the accompanying drawings.

In the drawings:

FIG. 4 is an end perspective view of a vacuum chamber of the present invention, with the door open.

FIG. 5 is a diagram of the temperature control system of the present invention.

FIG. 6 is an end elevation of one side of a vacuum chamber of the invention, showing the condenser plate and header construction.

FIG. 7 is a fragmentary perspective of one condenser plate.

FIG. 8 is a transverse section of one condenser plate.

FIG. 9 is a side elevation with parts broken away of one of the product carrying cars that can be wheeled into and out of the vacuum chambers.

FIG. 10 is an end elevation of one of the cars.

FIG. 11 is a section taken on lines 11—11 of FIG. 10, showing the bottom of one of the heated shelves in the cars.

FIG. 12 is a fragmentary section taken on lines 12—12 of FIG. 10 showing the connection of the car shelves to their inlet header.

FIG. 13 is a section taken on lines 13—13 of FIG. 11, showing the formation of car shelf passageways.

FIG. 14 is a diagram of the condenser plate cooling and defrost connections for three vacuum chambers.

FIG. 15 is a diagram of a multiple chamber glycol heating and circulating system.

FIG. 16 is a graph showing the refrigeration loads over a series of cycles, wherein the vacuum chambers are connected in tandem and operated sequentially in accordance with the present invention.

*General Arrangement*

Figure 1:
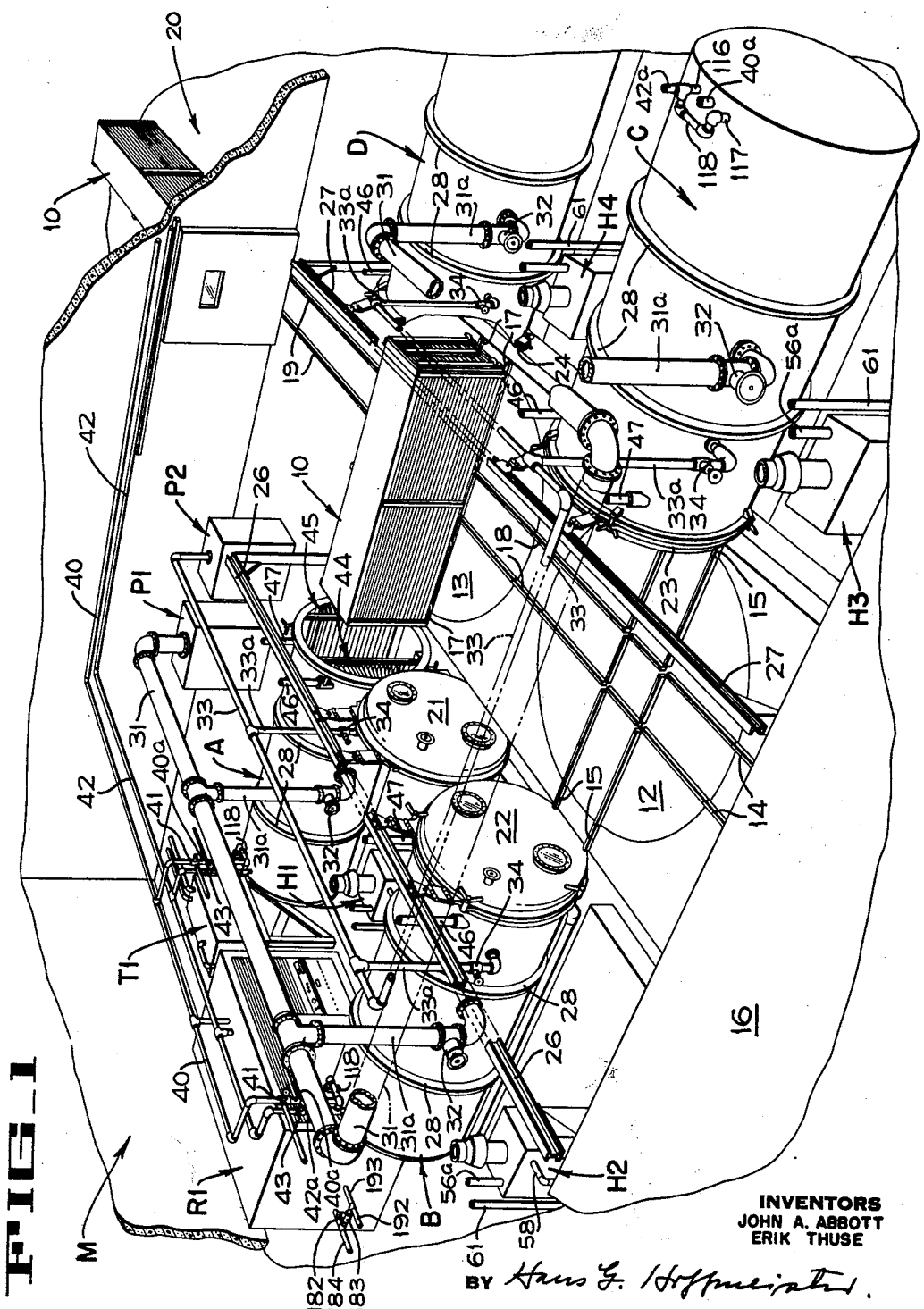
FIG. 1 is a fragmentary perspective of a four vacuum chamber freeze drying installation of the present invention.
Figure 2:
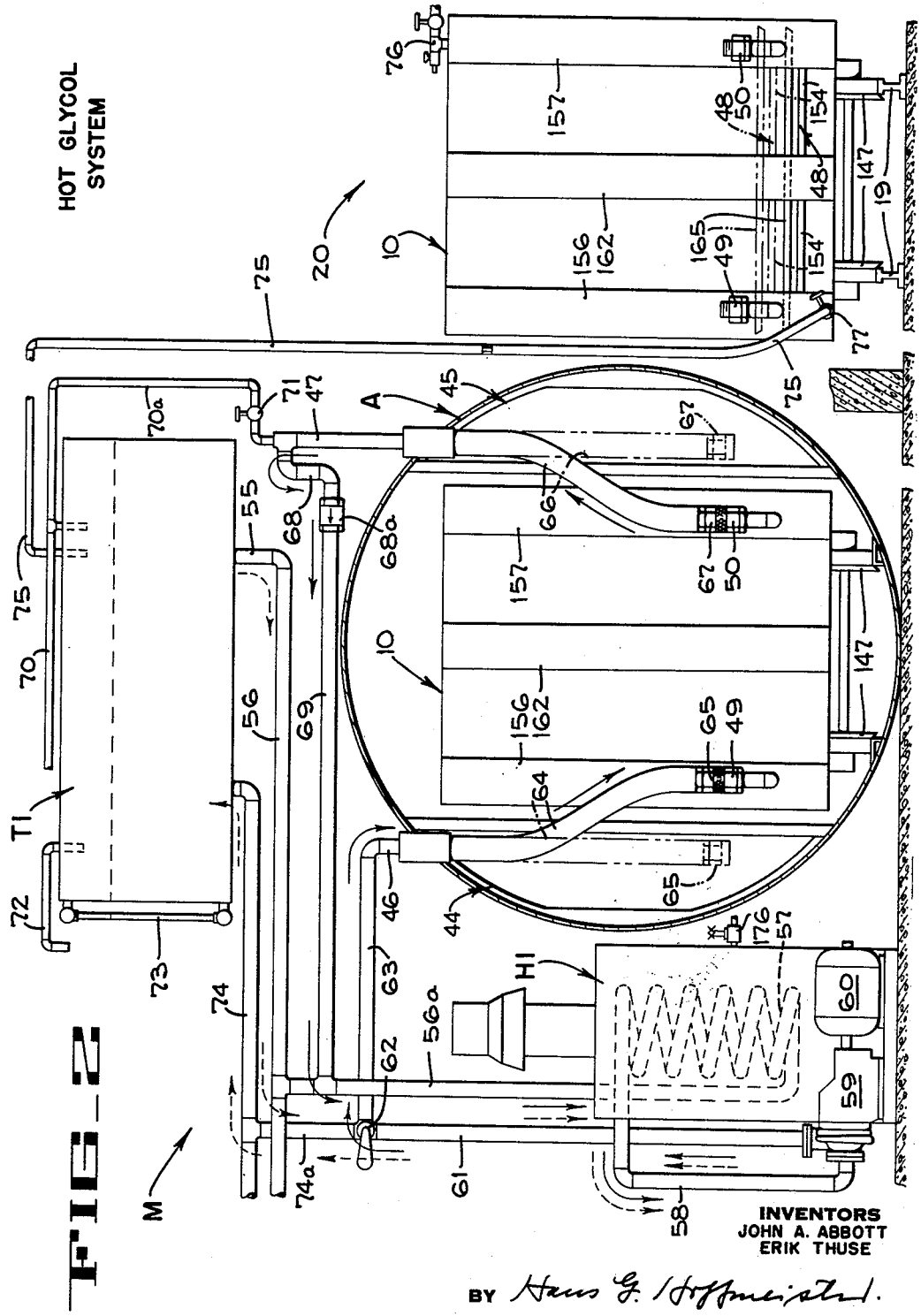
FIG. 2 is a fragmentary diagrammatic section of the system for filling the cars with a hot product-heating solution, such as an ethylene glycol solution, and removing it from the cars.
Figure 3:
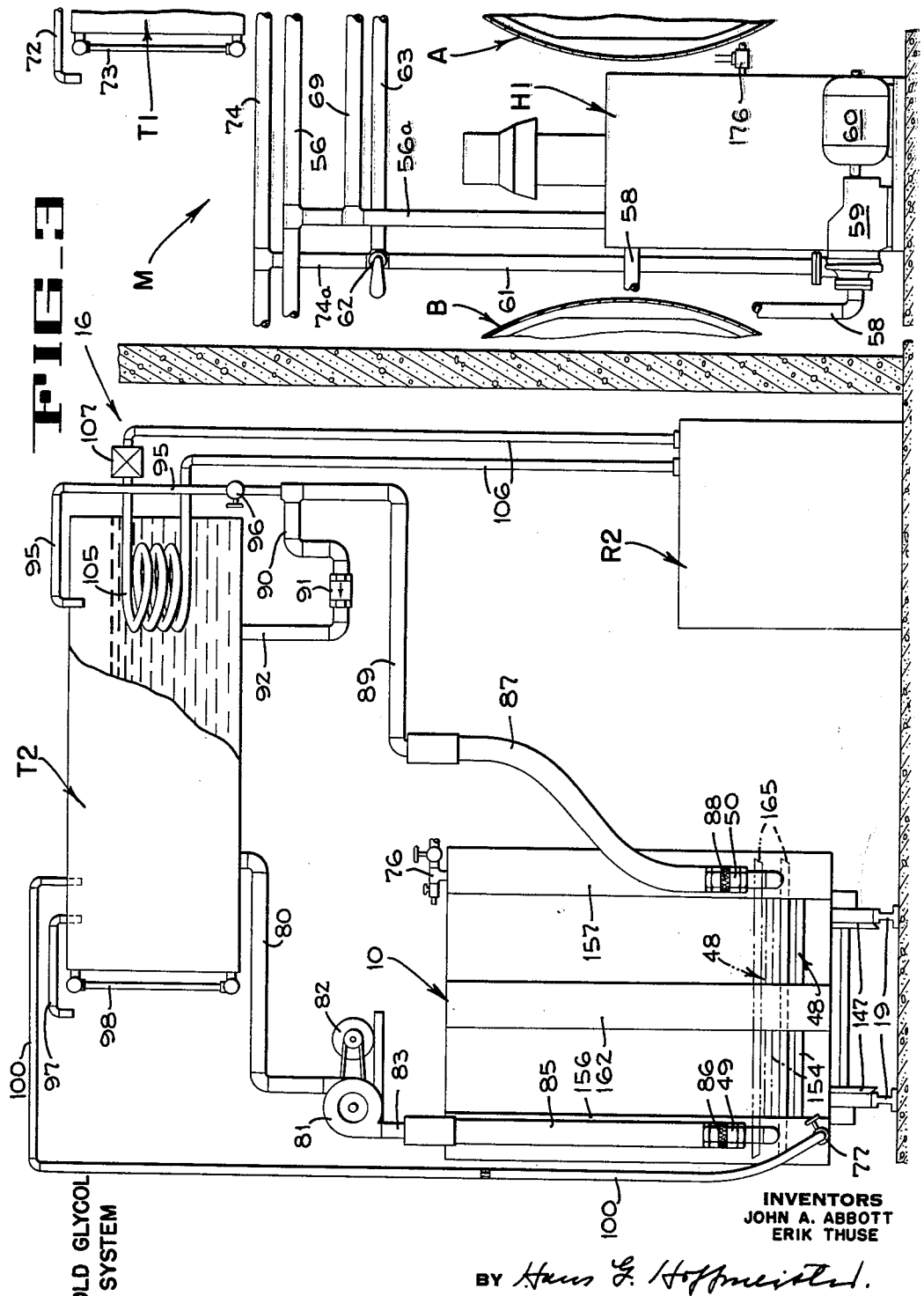
FIG. 3 is a fragmentary diagrammatic section of a system for filling cars with a cold glycol solution, or other liquid, and removing the solution therefrom.

The general arrangement of a multichamber freeze drying system of the present invention is shown in FIG. 1, with piping connections for the product-carrying cars appearing in FIGS. 2 and 3. Details of the refrigerant connections to the vacuum chambers will be described in a later section. The installation includes a main room M, in which four cylindrical vacuum chambers A, B, C and D are mounted. In a four vacuum chamber system, there will normally be provided five product-carrying cars 10, all of these being identical. In FIG. 1 there is shown a pair of turntables 12 and 13 disposed in front of chambers B and C, and A and D, respectively. Tracks 14 lead from a cold, or product-loading, room 16 to the turntable 12. Tracks 15 lead from turntable 12 to the chambers B and C, and a similar set of tracks 17 lead from turntable 13 to chambers A and D. Tracks 18 interconnect the turntables 12 and 13, and tracks 19 lead from turntable 13 to a dry, or product unloading, room 20. In FIG. 1, one of the cars 10 is shown just after removal from chamber A. At this time, there will be cars in chambers B, C and D, and a fifth car appears in the dry room 20. Chamber doors 21–24 are provided for vacuum chambers A–D respectively, and the doors are mounted on overhead tracks 26 and 27, for ready manipulation. The cylindrical vacuum chambers are each reinforced by a pair of spaced annular ribs 28.

Continuing the general description of the freeze drying system of the invention, in the main room M is a heavy duty or pump-down vacuum pump P1 which connects to each vacuum chamber by a main vacuum line 31, and downcomers 31a leading to each of the vacuum chambers A–D. A valve 32 is mounted in each downcomer 31a. Also in the main room M is a lighter duty or holding vacuum pump P2. This pump connects by main lines 33 and downcomers 33a to the vacuum chambers, through individual valves 34 at each chamber. This arrangement makes it possible to connect the heavy duty vacuum pump P1 to any chamber for an initial pump-down operation, and thereafter the heavy duty pump can be replaced by the holding vacuum pump P2 by manipulation of the valves. In the broader aspects of the invention, the chambers may be evacuated by steam ejectors, and the term vacuum pump is intended to refer to either ejectors or mechanical pumps unless otherwise specified.

A central refrigeration unit R1 cools hollow refrigerant conducting elements in the form of condenser plates mounted in the vacuum chambers A–D. The compressed, gaseous refrigerant from the refrigeration unit R1 is conducted to each vacuum chamber by an inlet header 40, having branches at each chamber leading to a valve 41. A branch 40a leads from each valve 41 to the associated vacuum chamber. Also connected to refrigeration unit R1 is a suction or return header 42 that has a branch at each vacuum chamber that is connected to a two way valve 43. A branch line 42a connects each chamber to its two way valve 43.

As indicated at vacuum chamber A in FIG. 1, and as seen more clearly in FIG. 4, each vacuum chamber is provided with left and right sets 44 and 45 of vapor condensing plates. These are hollow plates that are refrigerated to condense and freeze vapor sublimed from the product loaded in the cars in the vacuum chamber, during the drying process. With some products the product need not be frozen before introduction into the vacuum chamber. In this case a certain percentage of product moisture will be evaporated before the vacuum is pulled down sufficiently to cause the remainder of the product moisture to freeze.

It has been mentioned that a hot liquid such as a glycol solution is circulated through the shelves of the cars during the sublimation process. Referring to FIG. 1, in the main room M a storage or make-up tank T1 is provided for the hot glycol solution, this tank and its piping also being indicated diagrammatically in FIG. 2. By means of suitable valves and piping to be described later in this specification, the tank T1 serves as both a supply and expansion tank for each of four heaters, H1, H2, H3, and H4, provided for vacuum chambers A–D, respectively.

Each of the vacuum chambers A–D has a hot glycol inlet line 46 and a glycol return line 47 connected thereto. As previously mentioned, each of the cars 10 has a tier of hollow shelves for supporting trays of the frozen product to be dried, through which shelves the hot glycol solution circulates. A few of these shelves are indicated at 48 in the cars appearing in FIGS. 2 and 3. Details of the shelves as well as of the car construction itself will be described later in this specification. As indicated in FIG. 2, the hollow shelves 48 are connected by means not shown in the diagram to an inlet valved coupling 49 on the car, and to an outlet valved coupling 50 on the car. When a car is in a vacuum chamber, as seen in FIG. 2, connections are made to these couplings for supplying hot glycol solution to the car shelves.

Referring briefly to FIG. 3, the cold, or product-loading room 16 is shown. In this room is a tank T2 which contains a supply of cooled glycol solution, this solution being maintained at the desired temperature by a refrigerator unit R2, as will be explained presently. The refrigerated glycol solution can be circulated through the car in cold room 16, and can thereafter be removed from the car and returned to the tank T2.

To summarize the system just described very briefly, in a four vacuum chamber system, and in normal operation, at least three of the vacuum chambers will contain cars 10 wherein the product is being freeze-dried. During each cycle, one of the vacuum chambers will be opened for the introduction of or removal of a car for defrosting and flushing of its condenser plate. There will usually be a car in either the cold or loading room 16, or in the dry or unloading room 20, depending upon the stage in the cycle under consideration.

Hot Glycol System

The hot glycol system, including the storage tank T1 for the hot glycol solution, is shown somewhat diagrammatically in FIG. 2. Tank T1, which has been previously described, is in the main room M. Leading down from the tank is an outlet line 55 that is connected to a delivery line 56 which, as seen in FIG. 2, is in turn connected to a downwardly extending branch line 56a. Line 56a connects to the heating coil 57 of the heater H1 associated with vacuum chamber A. From the heating coil, the hot liquid flows through an inlet line 58 of a circulating pump 59 driven by a motor 60. The pump forces heated liquid through an upwardly extending discharge line 61 that connects to a valve 62. Valve 62 can be a two way valve that is set to either direct the liquid back to the tank T1, or to a car 10 disposed in vacuum chamber A, as will be described in detail presently. The valve 62 may also be an automatic spring loaded relief valve.

Also leading from the valve 62 is a laterally extending inlet line 63 that connects to the downwardly extending glycol inlet line 46 for the vacuum chamber A, as previously described in the description of the mechanism of FIG. 1. Extending downwardly from line 46 is a flexible hose 64, the lower end of which is fitted with a combined valve and quick disconnect coupling 65, for connection to the mating valved couplings 49 on the cars, previously described.

Valved couplings 65 and 49 are of the type that can be quickly connected and disconnected without loss of liquid and without trapping of air, and will automatically close off both of their respective lines when they are disconnected.

As will be explained in connection with the description of a car that follows, the heated glycol solution leaves the car by means of another valved coupling 50, previously referred to, which is connected to a hose 66 by means of a valved coupling 67 mounted on the lower end of the hose. The upper end of hose 66 connects to the glycol return line 47 that extends upwardly from the vacuum chamber, as previously described in the description of the mechanism of FIG. 1. Liquid leaving the car by means of line 47 flows through an air trap 68, a check valve 68a, and back to the heater H1 by means of a branch line 69. Connected to the top of tank T1 is an air vent bleeder line 70, and a riser 70a extends upwardly from the trap 68 and connects to line 70. The riser can be closed off by means of an air vent valve 71. The air vent lines direct air and any drops of liquid entrained therewith back into the tank T1. At the other end of the tank is an air vent 72 for venting the tank to the atmosphere. A sight gauge 73 is mounted on one end of the tank. Leading from the bottom of the tank T1 is a re-circulation return line 74 which, as seen in FIG. 2, has a downwardly extending branch 74a that is connected to the two way valve 62 previously referred to.

The hot glycol system just described has two phases of operation, a car heating phase indicated by solid arrows in FIG. 2, and a recirculating phase indicated by dashed arrows. These phases will be reviewed briefly. In the car heating phase, as indicated by the solid arrows, hot liquid leaves the pump 59 by means of line 61. Two way valve 62 is set to divert the liquid through the lateral inlet line 63, line 46, hose 64, coupling parts 65 and 49, and hence into the inlet sections of the shelves in car 10. After warming the product in the car, the liquid leaves the car by way of coupling parts 50 and 67, and hose 66, and is forced up the return line 47. The liquid flows through the trap 68, check valve 68a, branch line 69, and back to the branch line 56a. The downcoming branch 56a of the delivery line returns the liquid directly to the heating coil 57 of the heater H1. During initial filling of the shelves 48 in the car 10, make-up liquid will be supplied by the line 55 extending downwardly from the tank T1 and the line 56. The air vent valve 71 will be open and air trapped in trap 68 during the filling operation will be vented by line 70 back to the tank.

When car 10 is removed from the vacuum chamber A, it is desirable to recirculate and heat liquid in the tank T1 to make up for heat losses in the system, and it is also desirable to make use of heater H1 for maintaining the glycol temperature, so that all four heaters have optimum utilization of their capacity. In order to accomplish this, the two way valve 62 is turned to its other position. With this set-up, liquid from upwardly extending line 61 flows from the heater H1 through valve 62 through a branch line 74a of the recirculation header line 74, and thence on into the tank T1. This flow is indicated by the dashed arrows. As is also indicated by dashed arrows, liquid leaves the tank T1 through line 55, flows through delivery line 56, but it cannot flow backward through line 69 because of check valve 68a, so it flows down the branch line 56a, and back into the heating coil 57 of heater H1. Thus, the glycol in tank T1 is maintained at its desired temperature and is ready for the most efficient type of operation as soon as a car is again introduced into the vacuum chamber A.

The manner in which this type of connection operates in conjunction with a series of tandem connected vacuum chambers will be described later in this specification relative to the diagram of FIG. 15.

As is also indicated in FIG. 2, means are provided to empty cars 10 of the hot glycol which they contain, while the cars are in the dry or unloading room 20. The cars are emptied in this fashion in order that there will not be hot glycol solution in the car shelves when the cars are transferred to the cold room where they are loaded with a product that is either frozen or will be frozen directly in the car. The glycol solution is returned to the tank T1, so that the heat in the solution is recovered.

In order to purge the car 10 in the drying room 20, of the hot glycol solution, a separate purging line 75 is connected from the bottom of the hot glycol circulatory system in the car to the top of the hot glycol tank T1. A valved air inlet fitting 76 is connected to an upper portion of the circulatory system of the car. The connection of the car outlet to the purge line 75 is also valved at 77. In order to empty the car of the hot glycol solution, the air and purging line connections are made, purge line valve 77 is opened, and compressed air is introduced to the car by operating the valve at air connection 76, thereby transferring the hot glycol solution from the car into the tank T1. The valve 77 at the lower end of the purging line 75 is then closed, the purging line 75 and the air line is disconnected, and the car transferred to the cold or loading room 16.

Cold Glycol System

The cold glycol system previously referred to briefly is illustrated in FIG. 3. In this figure, a car 10 is shown positioned in the cold room 16. In this room, trays of the frozen product are loaded in the car, or alternatively the product may be unfrozen when loaded and the system operated to freeze the product after loading. Leading from the cold glycol storage tank T2 is a discharge line 80 which connects to the inlet of a circulating pump 81 driven by a motor 82. The discharge line 83 of the pump connects to a flexible inlet hose 85 having a self-closing valve coupling 86 mounted at the lower end thereof. Hose 85 and coupling 86 are of the same construction as the hose 64 and coupling 65 previously described in connection with the hot glycol system. Connected to the outlet portion of the car circulatory system is a flexible outlet hose 87 having a self-closing valved coupling 88. Couplings 86 and 88 are formed for quick connection with the valved couplings 49 and 50 of the car. Leading from the upper end of the outlet hose 87 is an outlet line 89 which connects to an airtrap 90. A check valve 91 is connected to the air trap and delivers liquid to a return line 92 leading back to the tank T2. As in the hot glycol system previously described, there is an air vent line 95 leading from the trap 90 to the tank, which vent line can be closed off by an air vent valve 96. Also as in the system previously described, there is an atmospheric air vent 97 that vents the top of the tank to the atmosphere. A sight gauge 98 is provided on tank T2.

Connected to the purge valve 77 on the car, previously described in connection with the hot glycol system, is a cold glycol purging line 100 that leads back into the tank T2. The same valved, compressed air inlet fitting 76, that was provided for purging car 10 of hot glycol solution in the drying room 20, is employed in the cold room 16 for purging the car of cold glycol solution. The glycol solution in tank T2 is refrigerated by a refrigeration unit R2 connected to a refrigeration coil 105 disposed in the liquid in the tank by means of line 106, and an expansion valve 107 is provided in the usual manner. In operation, as car 10 with shelves empty of liquid is brought into the cold room, the connections of hoses 85 and 87 with the car couplings 49 and 50 respectively are made, air vent valve 96 is opened, and the pump is started. This fills the car with cold glycol solution from the tank T2, after which air vent valve 96 is closed. The pump and motor unit keep the glycol solution circulating through the car, to cool the car and its contents. The capacity of the refrigerating unit R2 is determined by whether or not the circulation of cold glycol solution through the car is intended to merely keep a previously frozen product in its frozen condition, or is intended to actually freeze the product in the car, after it has been loaded therein in an unfrozen condition. Also, and as previously mentioned, some products may be frozen in the vacuum chamber, in which case the cold glycol system may not be connected to the car.

After the car 10 has been fully loaded with a frozen product, or loaded with an unfrozen product that is frozen in the car, the car is ready for removal from the cold room 16 and transfer to one of the vacuum chambers in the main room M. Before such removal, the glycol circulating hoses 85 and 87 are uncoupled from the car, purge valve 77 is opened, air pressure is applied to the fitting 76, and the cold glycol is transferred from the car shelves 48 to the cold glycol tank T2. The glycol solution in the tank T2 can always be kept at the desired temperature by suitable control of the refrigeration R2.

Vacuum Chamber and Condenser Plate Construction

The construction, mounting and local connections to the condenser plates in the vacuum chamber are shown in FIGURES 4 and 6–8. As previously mentioned, and as viewed in FIG. 4, there is a left set 44 of condenser plates, and a right set 45, through which refrigerant is circulated by the refrigeration system R1, seen in FIG. 1. The refrigerant is introduced into the condenser plates by means of an external branch line 40a connected through a valve 41 (FIGS. 1 and 14) to the main refrigerant or compression line 40, previously described. Branch line 40a is connected to a central inlet or downcomer pipe 110 that is disposed within and at the rear of the vacuum chamber. Extending laterally from the lower end of down-comer pipe 110 are branch headers 111 and 112, which connect to riser pipes 113 and 114 respectively. Riser pipe 113 forms an inlet for condenser plate section 44 and riser pipe 114 forms an inlet for condenser plate section 45. As seen in FIG. 4 and as indicated by arrows, the refrigerant is conducted out from the set 44 of condenser plates by an outlet riser pipe 116, and a companion riser pipe 117 conducts the refrigerant out of the set 45 of condenser plates. The outlet riser pipes 116 and 117 are connected together by a cross connection 118 external of the vacuum chamber. The junction of the cross connection 118 and riser pipe 116 is connected to the branch discharge or suction line 42a, previously described. As seen in FIGS. 1 and 14, branch line 42a connects to valve 43 and hence to the main refrigerant discharge header 42, all as mentioned previously.

The two sets 44 and 45 of condenser plates are disposed in each vacuum chamber for maximum utilization of space, maximum efficiency of fluid flow, and maximum efficiency and minimum pressure drop of vapor flow from the product to the condenser plates. The disposition of the condenser plates and their individual connections are best seen in FIG. 6, wherein the right set 45 of condenser plates appears. The set of condenser plates may be considered to be divided into two groups, an upper group of plates 120, consisting of the five upper plates, and a lower group of plates 120a, consisting of the ten lower plates. All but one of the plates 120 and 120a are shown diagrammatically in FIG. 6, the middle plate being sectioned. All of the plates 120 and 120a are of identical construction, the only difference between them being in their mounting. As is seen in FIG. 6, the upper plates 120 are inclined upwardly from their outer edges to their inner edges, whereas the lower plates 120a are inclined downwardly from their outer edges to their inner edges.

As seen in FIGS. 7 and 8, the plates 120 (or 120a as the case may be) are formed of mating sheet metal sections, there being an upper section 121 and a lower section 122 for each complete plate. The sections 121 and 122 are each formed with chanenls 123 and 124 which cooperate, when the sections are assembled, to form refrigerant passageways 125. As seen in FIG. 7, the rearward ends of the channels 125 are connected by header sections 126 formed in the manner of channels 125 and the opposite ends are connected by corresponding header sections 126a of the same construction. In order to insure a tortuous path or flow of refrigerant through each plate, the headers 126 at the rearward end of the plates are discontinuous whereas the headers 126a at the forward end of the plates are joined by a cross connection 127, the result being a left and right bank of channels in each plate, with a single cross connection between the banks.

The plates are mounted in the vacuum chamber by means of notched uprights 128 disposed at the inner edges of the plates and notched arcuate webs 130 disposed along the walls of the chamber at the outer edges of the plates. The notches in uprights 128 and in webs 130 are located to provide the inclination of the upper and lower groups of plates previously described, so that the assembled condenser plates can be said to form a general fan like arrangement in the vacuum chamber which provides efficient utilization of available space for the plates in the chamber. Also, this inclination of the plates facilitates gravity drainage from the plates during defrosting.

The refrigerant connections to the condenser plates 120 and 120a are arranged so that the refrigerant enters each plate along its lower edge and leaves the plate from its upper edge. Referring again to FIG. 6, there are five laterally extending inlet headers 132 leading from inlet riser 114 to the outer edges of upper plates 120, which edges are also their lower edges. There are 10 laterally extending inlet headers 133 leading from inlet riser 114 to the inner edges of the lower plates 120a, these edges also being the lower edges of such plates. Thus the refrigerant is always introduced into the lower portions of each of the plates with this header construction.

Similarly, there are five laterally extending outlet headers 135 leading from the inner edges (their upper edges) of the upper five plates 120 to the outlet riser 117. Ten more lateral outlet headers 136 lead from the outer (upper) edges of the ten lower plates 120a to the outlet riser 117. Thus just as the inlet headers connect to the lower edges of their respective plates, the outlet headers connect to the upper edges of the corresponding plates, thereby providing optimum heat flow and heat exchange during the refrigeration process. As seen in FIG. 7, the plates are provided with nipples 137 and 138 for connection to their respective headers, details of this connection not being critical to the invention. As previously mentioned, the inner edges of the sets 44 and 45 of condenser plates lie in vertical planes, so that the car can be made so that its sides are closely adjacent to the edges of the plates, thereby improving the transfer of sublimed vapor from the product to the condenser plates.

Car Construction

The construction of one of the cars 10 is illustrated in FIGS. 9–13. Since all cars are identical, only one will be described. At the bottom of the car is a rectangular frame 146, which mounts four railroad type wheel and axle assemblies 147. The axles are mounted in suitable anti-friction bearings (not shown) so that one man can manipulate a loaded car along the tracks, even though the total weight of the car and the product thereon may be in the order of four tons. Extending upwardly from the frame 146 are posts 148 of channel shape, and the upper ends of the posts are tied together by suitable longitudinal braces 149 (FIG. 9). Intermediate longitudinal braces 149a are also provided for the vertical posts 148. Extending the length of the car and disposed between the vertical posts 148, are fourteen vertically spaced heated shelves, each shelf being indicated generally at 48. As seen in the bottom plan of FIG. 11, shelves 48 are actually made up of two identical, longitudinally extending sections, 150a and 150b.

As seen in FIGS. 12 and 13, the sections of heated shelves 48 are actually made of two assembled sheet metal plates 151 and 152. The lower section 152 is corrugated to form a sinuous channel 153, the result being that when the lower section 152 is welded to the upper section 151, a sinuous passage is formed along the length of the section.

The heated shelves 48 rest on laterally extending angle brackets 154. As seen in FIG. 9, one tier of brackets 154 is welded to the central posts 148, and as indicated in FIG. 12, other tiers of brackets 154 are welded to the end posts 148. In order to introduce the glycol to the heated shelves, a vertically extending inlet header 156 is provided at the outer end of the car. This is the left header as viewed in FIG. 10. A distribution standpipe 156a extends upwardly within inlet header 156, and as seen in FIG. 9, the lower end of the standpipe connects with the valved inlet coupling 49, previously described. Extending vertically on the other side of the car (the right side as viewed in FIG. 10) is an outlet header 157, the lower end of which mounts the valved outlet coupling 50 previously described. In order to conduct heated glycol solution from the inlet header 156 to the heated shelves 48, inlet pipes 158 extend rearwardly from the inlet header and connect through the bottom section of each shelf, this construction being clearly shown in FIG. 12.

As seen in the bottom plan of FIG. 11, the pipes 158 for each shelf connect to one end of the tortuous passageway of the shelf. A similar set of pipes 159 (one only of which appears in FIG. 11) connect from the delivery end of the heated shelves to the outlet header 157. As is also seen in FIG. 11, a cross over pipe 161 is provided between the two sections 150a, 150b of each shelf, which pipes are guarded by a vertical channel shaped guard 162.

The product trays 165 are made of oxidized sheet aluminum, which provides high heat conduction as well as uniform heat distribution and optimum transfer of heat to the product. Two types of trays may be used. Illustrated in the drawings is a set of trays that are formed with feet 166 made of heat insulating material. The feet extend longitudinally of the trays. Since the trays are loaded from the sides of the car, they extend laterally of the car and are of the same length as the width of the car. With this construction the trays are disposed so that the distance between the product and the lower heated shelves upon which they rest, is the same as the distance between the product and the upper heated shelves directly above. The heat reaching the product is radiant heat. Since the trays do not rest directly on the shelves, and since the trays and product receive heat from both the supporting shelf and the one above it by radiation, both shelves can be raised to a temperature higher than that which would scorch the product if the trays rested on the shelves, and the dried portions of the product were at shelf temperature. This permits the use of optimum shelf temperature for relatively quick drying by radiant heat, without scorching. It has been found that the temperature of "black body" trays thus supported, is but little higher than the temperature of the dried portions of the product, and is lower than the shelf temperature.

The trays may be formed without feet, in which case they assume the temperature of the heated shelves, which can be controlled directly. Such an installation might be used, for example, for products wherein the radiant heat from relatively hot shelves might scorch the surface of the product.

As mentioned, in the system being described, the trays extend the full width of the car and are disposed in rows lengthwise along the car. The width of the trays, that is, their extent longitudinally of the car is such that there will be six trays resting on each of the heated shelves 48. Since there are fourteen heated shelves, the car will hold 84 individual trays when it is fully loaded. It will be noted that with this construction, the trays are easily loaded from either side of the car, and although they are long enough to extend the full width of the car, they need not be wide and hence are easily handled.

Temperature Control System

As previously mentioned, it is important that the temperature of the product be precisely controlled. If the process is stopped before all of the ice has sublimed from the product, some of the product will be subsequently wetted and will spoil. On the other hand, if the process is carried on at too high a temperature after all of the ice has sublimed from the product, then the product temperature will rise relatively quickly, and the product, or at least portions of the product on various trays, may be scorched. It has also been mentioned that the application of thermo-couples directly into the product for measuring and recording the temperature of the product has not proven to be a reliable temperature measuring means.

In the system of the present invention, the use of oxidized or anodized aluminum trays of high heat conductivity and high heat emissivity makes possible a temperature control system wherein the temperatures control is primarily that of controlling the temperature of the trays themselves. This is accomplished in the system indicated diagrammatically in FIG. 5. Here the heated shelves 48 are shown supporting trays 165 by means of feet 166. Resting directly on the trays 165, and surrounded by the food product indicated generally at F, is a set of thermostatic switches 170. These switches primarily sense the temperature of the trays 165 on which they rest. It has been found that three of such switches, suitably distributed among the trays, provide a safe, sensitive control. Extending from each of the thermostatic switches 170 are electric lines 171 which terminate in plugs 172. The plugs 172 can each be plugged into sockets 173, the sockets being wired in series into electric lines 174. Lines 174 are in series with a solenoid control valve 176, that controls the gas supplied to the heater, H1 in the drawing, and with the source voltage 177.

In the system of the invention, adequate control is provided by mounting control switches on three trays. The trays are shown directly above one another in the diagram of FIG. 5, but actually they will be judiciously located in the car. If any one of the thermostatic control trays that mount a switch 170 exceeds the control or pre-set temperature, the gas heater will be turned off, and will remain off so long as that tray is above such temperature. As soon as the tray cools down to the control temperature (and assuming that none of the other trays have in the meantime exceeded it, which is unlikely since the heat has been turned off) the series circuit will be reestablished, and the solenoid control valve 176 will operate to redirect the gas supply to the heater. With this system, near the end of the process, one or more of the control trays will successively reach the control temperature, with which the heater will be turned off, but if the material on the tray is still frozen, the heater will soon be turned on again. When all of the material on one control tray has dried and that control tray reaches the control temperature, the tray will cool down very slowly and the heater will remain off for a period of time that is noticeably longer than the previous off periods. This gives an indication that the freeze drying process is very near completion for all trays.

It is to be understood that the operator will know to a fairly accurate degree, the expected length of time required for completion of the process after indication is given that the material on one tray is dry. This knowledge will be based on past experience and upon the weight and nature of the product being dried. Thus it is only necessary to observe or record the on-off operation of the heater associated with the vacuum chamber, and when the heater remains off for an unusually long length of time, as opposed to regularly cycling between on and off, the operator will know that almost all of the product in the vacuum chamber has been dried. Further continuation of the heating cycle can now be controlled by the operator, and danger of scorching the product will have been at a minimum during the drying process.

Although they do not form part of the temperature control system, thermo couples are used to give an indication of shelf temperature, tray temperature, and product temperature. When all of these temperatures converge and are almost equal, this is an indication that the drying process is complete.

Combined Defrosting and Cooling Operation

As previously mentioned, refrigerant heat ordinarily lost in the condenser is saved, and the heat of compression of the refrigerator unit is utilized advantageously, by a combined defrost and cooling system illustrated in FIG. 14. In this figure, three of the vacuum chambers A, B and C, and their refrigeration connections are illustrated diagrammatically. In the diagram, unit A is being defrosted and units B and C are being refrigerated. Unit D, which normally would also be under refrigeration, is not shown. The car will ordinarily have been removed from unit A, whereas units B and C will contain a loaded car (not shown), and will be closed. The parts of the main refrigeration unit illustrated generally in FIG. 1, are separated into components in FIG. 14, and the internal connection of the components is shown in the diagram of FIG. 14. These components, however, are illustrated diagrammatically in the figure.

The defrost piping, which has not been previously described, will now be traced. The refrigerator compressor 180 has its inlet connected to the inlet or suction line 42. The compressed refrigerant is discharged from the outlet of the compressor 180 and passes through an oil separator 181, from which a discharge line 182 leads to a two-way valve 183. Extending from the inlet side of valve 183 is a defrost feeder line 184, from which branch lines 186 extend, there being one branch line for each of the vacuum chambers. Branch lines 186 each terminate at the two-way valve 43, which valves are connected between the junctions of refrigeration discharge lines 42 and their branch lines 42a, connected to risers 116, 117 as previously described. The defrost feeder line 184, and branch lines 186 only function in connection with one of the vacuum chambers at a time, namely, that being defrosted.

Lines 184, 186 just described form the defrost inlet circuit. The defrost outlet circuit will now be described. The two-way valves 41 at the junction of the branches from the main refrigeration inlet header line 40 and the branches 40a connected to the central downcomer pipe 110 have been previously described. Leading from each valve 41 is a defrost discharge branch line 191, and all branch lines 191 connect to a defrost discharge defrost header line 192. The discharge end of header line 192, which is at two-way valve 183, connects to a line 193, which line is also connected to the other side of the two-way valve 183. Line 193 leads to the refrigerant condenser 194 forming part of the refrigeration unit R1. The refrigerant is discharged from the condenser 194 by means of a line 196 connected to the usual receiver 197, and the cold compressed refrigerant is conducted from the receiver by line 198 to the refrigerant header line 40. As seen in FIG. 14, mounted in each branch leading from header line 40 to the associated valve 41 is a conventional expansion valve 200. During cooling, the expanding refrigerant leaves the expansion valves 200, flows through valves 41, down-comers 110, and risers 113 and 114 for introduction into the condenser plates of those units which are being cooled.

The defrost and refrigeration lines and associated valves have been described. The path of the refrigerant will now be traced from the compressor 180 through the unit A, which is being defrosted, thence through the unit B, which is being cooled. Since unit C is also being cooled in the diagram of FIG. 14, the path of the refrigerant through that unit will be the same as that through the unit B.

Starting from the compressor 180, the hot compressed gas (indicated by dashed arrows) flows through the oil separator 181 to the valve 183; this valve will be set to block flow between lines 182, 193 and to divert the hot gas along defrost inlet line 184 to branch lines 186. The valve 43 in units B and C will be set so that branch lines 186 for these units are closed. However, valve 43 for unit A will be set so that branch line 186 is connected to what is normally the refrigeration discharge branch line 42a, thereby conducting hot refrigerant gas, as indicated by the dashed arrows, down through the risers 116 and 117 in a direction normal to the flow of refrigerant. The heated refrigeration gas thereby flows through the condenser plate sets 44 and 45, and out and down the risers 113, 114, whereupon the fluid streams from both sets of plates converge and rise through the refrigeration down-comer pipe 110. After the hot gas leaves the down-comer pipe 110, it enters branch line 40a and the absorption of heat from the ice crystals on the condenser plates will have condensed the refrigerant gas, and the hot gas will have thereby done part of the work that would normally have to be done by the condenser, with an appreciable loss of heat at the condenser. The valve 41 is set so that the cooled refrigerant is directed from line 40a to the defrost discharge line 191 and hence back to the defrost header line 192. The setting of valve 183, previously described, is such that the refrigerant passes from line 192 through the inlet line 193 the condenser 194, through the receiver 197, line 198 and the expansion valves 200 of all units being cooled.

With the valves 41 set as indicated in FIG. 14, the compressed and cooled refrigerant will not flow through the expansion valve 200 for unit A because valve 41 at that unit is set to block off branch 40a from the expansion valve. Valve 41 at unit A diverts gas from branch 40a to line 191 and back to the defrost header line 192, as previously described.

The cooled refrigerant in header line 40 does, however, serve to cool units B and C in the normal manner. Referring to unit B, the refrigerant in header line 40 passes through the expansion valve 200 associated with unit B from which the expanded refrigerant is directed to valve 41 associated with that unit. This valve will have been set to block the defrost discharge line 191 and to direct the refrigerant from the expansion valve through the branch line 40a, and down the central down-comer pipe 110. This path of the refrigerant is indicated by the solid arrows in the diagram. The refrigerant then passes through the risers 113, 114, the sets 44, 45 of condenser plates, and out of the risers 116, 117. The streams of gas are merged by cross connection 118 and the merged stream is conducted by branch line 42a to valve 43. This valve is set so that the refrigerant passes directly through the valve to the header line 42, which is the main suction line of the refrigeration system, and directs the expanded refrigerant back to the compressor. As mentioned, the same cooling cycle is being carried out in connection with the vacuum chamber C, as indicated by the solid arrows applied to the pipes of that unit.

Thus by proper manipulation of valves 41 and 43, any of the units may be defrosted by the abstraction of heat from the gaseous refrigerant that would otherwise be wasted. If desired, all valves 41 and 43 may be set to close off defrost lines 191 and 186 respectively, and the valve 183, between the oil separator 181 and the condenser 194, may be set in its other position. With this setting compressed gas passes directly from the oil separator 181 to the condenser 194.

*Hot Glycol System—Multiple Installation*

The operation of the hot glycol system has been previously described in connection with a single unit and FIG. 2. In the system of the invention, a series of evaporating chambers are connected for a simultaneous operation. FIG. 15 illustrates simultaneous operation of three different phases of a cycle, with three different vacuum chambers A, B and C.

Referring to vacuum chamber A, the hot glycol is being circulated to heat the car, that is, to heat the shelves and food products mounted on trays in the car, with the car in the chamber. The flow of hot glycol solution is indicated by the dashed arrows. The heated glycol is pumped from heater H1 and valve 62 is set to direct liquid into lateral line 63, hose 64 and hence into the inlet header 156 for the heated car shelves. The glycol leaves the outlet header 157 and is conducted by hose 66 to line 47, trap 68, check valve 68a, line 69, down through branch line 56a, and back to the heater H1. Once the system has been filled, little or no glycol solution will flow from the tank into the circulating system by means of the fill and make-up line 55 leading from the tank. The volume of liquid being heated is but little greater than that necessary to heat the shelves, and the car heating circulatory system is virtually independent of the tank. This makes possible precise individual control of shelf temperature by controlling the heater for each unit.

At vacuum chamber B, the car has been removed and the heater H2 associated with that car is preheating the manifolds and adding heat to the glycol solution in the tank as required. This latter effect reduces the load on the other heaters by making up for heat losses from the tank.

At unit B, the valve 62 is set in its other position so that hot glycol leaving the heater H2 by line 61, as indicated by the dot-dash arrows, is directed to branch line 74a and to return line 74, whereupon the heated solution is forced into the tank T1. The heated solution leaves the tank T1 by means of fill and make-up line 55 and, again as indicated by the dot-dash arrows, flows through line 56 to branch line 56a of unit B, and hence back to the heater H2 for that unit. Since the hoses 64 and 66 are disconnected from the car, their valved couplings 65 and 67 respectively are automatically closed, and fluid cannot escape through these hoses.

At unit C, the car shelves have been previously emptied of cold glycol in the cold or loading room, and the loaded car has been placed in the evaporation chamber. The shelves are being filled with hot glycol from tank T1, as indicated by the solid arrows. The two way valve 62 for this unit is set exactly as is the two way valve 62 for the unit A, wherein the fluid is circulating through the shelves of the car in unit A.

As indicated by the solid arrows, fill or make-up liquid flows from the tank T1 through the fill or make-up line 55, along the main line 56, down the branch line 56a, and into the heater H3 for unit C. Hot liquid leaves the heater H3, and flows up line 61 where it is diverted by valve 62 to lateral line 63 and hence into the connected inlet hose 64. When the shelves are filled, the hot liquid flows through the shelves of the car and out the hose 66 to line 47, trap 68, check valve 68a, line 69, line 56a, and into the heater H3. Air that was trapped in the hollow shelves of the car must be expelled during filling. To accomplish this, the air vent valve 71 is open so that the body of air that is pushed ahead of the liquid as it fills the car, rises through line 47, through the valve 71, through the air vent line 70a into the main vent line 70, and hence back into the tank T1. When the lines are filled with liquid and all the trapped air has been expelled past the trap 68, air vent valve 71 will be closed, either manually or automatically, whereupon the car in unit C will be heated by recirculation as is that in unit A, and little or no make-up fluid from the tank T1 will be required during the remainder of the drying process.

*Load Equalizing Operation*

As previously mentioned, in accordance with the invention, by properly operating a series of units in tandem and sequentially, the refrigeration load required to operate four units (for example) need not be much greater than that required to operate a single unit, and optimum utilization of the refrigeration unit can be provided without overloading the unit. Also, by employing a pumpdown and a holding vacuum pump in connection with the tandem system, economies in vacuum maintenance are available.

The graph of FIG. 16 shows the refrigeration requirements in terms of Thousands of B.t.u. per Hour plotted against Percent Elapsed Cycle Time, and curves are given for each of the four vacuum chambers A, B, C and D. Indication is also given as to the connection and disconnection of the pumpdown and maintenance vacuum pump units.

In the graph of FIG. 16, only the refrigeration load of the cycle for unit A is shown as a continuous curve. The total refrigeration load for all four units A, B, C and D is indicated as curve RL. Referring to the refrigeration load curve for unit A, when the cycle starts the product temperature may not be much below freezing, so that as soon as pressure in the chamber drops under action of the pumpdown vacuum pump, large quantities of water vapor are given off and these place a momentarily heavy, but difficult to measure load on the refrigeration system, indicated by the discontinuity in the curve for unit A and the summation curve RL. As soon as the pumpdown period has continued long enough to remove most of the air, the main vacuum pump is disconnected, and the holding vacuum pump is connected into the chamber.

The initial flood of water vapor is soon frozen, with which the refrigeration load called for by unit A starts to drop. This is because the sublimation of the ice in the product that occurs as the pressure in the chamber is reduced, cools the product, so that the quantity of water vapor reaching the condenser plates drops, with a corresponding drop in the load on the refrigeration system. The heater circulatory system has not yet been started.

At the point indicated at "$x$" on the refrigeration load curve for unit A, the initial flood of vapor has been frozen, and the evaporation or sublimation of this vapor will have cooled the product almost down to a temperature where the water vapor pressure and the total pressure in the chamber are in equilibrium, namely, to a temperature of about $-40°$ F.

At this point the valves are operated to initiate circulation of the hot glycol solution through the car shelves. A new, but smaller flood of vapor results, with a corresponding temporary increase in the refrigeration load for unit A. As this sublimation under influence of heat applied to the product proceeds, the layer of dry product that surrounds the ice core becomes increasingly thick, and since this layer acts as a heat insulator, the rate of application of heat to the ice core decreases until point "$y$" on the curve for unit A is reached. At point "$y$" the rate of heat penetration and vapor sublimation are at equilibrium, and as the cycle progresses from that point less and less heat reaches the ice core in a given period of time. During this period, the refrigeration system is more than adequate to condense all of the vapor produced, so that the refrigeration load placed upon the system by unit A falls steadily and asymptotically toward a base line indicated at "$z$." The B.t.u./hour level of base line "$z$" represents the minimum, or idling load line for the refrigeration unit.

After elapse of about 75% of the cycle time, or 18 hours in the present example, the product will be dry, and the car can be removed from the vacuum chamber. The hump in the refrigeration load curves for each unit varies with the capacity of the heater to maintain the product at a selected temperature despite the cooling effect resulting from initial vapor sublimation.

In the system of the present invention operated in accordance with the diagram of FIG. 16, three units are in their drying cycle, and one unit is being unloaded and loaded. It will be noted that the curve RL showing the total refrigeration load for the system is not much different from the curve for a single unit, which shows how four units can be satisfactorily operated by a refrigeration unit that need not be much larger than that required to handle a single unit.

The elapsed time for unloading and loading a unit in a four unit system has been indicated in the curves of FIG. 16 as extending over about 25% of the cycle time for a unit. Actually this dead time can be reduced by prompt handling of the cars so that at times all four units will be thrown on to the refrigeration line. Even if this is done, the resultant total refrigeration load curve RL will not be significantly different from the RL curve of FIG. 16, and the advantages of the system of the present invention will still be available.

*Example of a Cycle*

An example of a cycle of operation of the system of the invention will now be given, with the understanding that the specific values presented are given by way of example only, and are not to be construed as being limiting.

The product, the processing of which will be described, is a batch of 3/16" x 5/8" diameter sliced green asparagus. The product will have been frozen with the slices in a free flowing condition, so that they are readily handled. A car will be in the cold room with its shelves cooled by the cold glycol system, ready for loading. The frozen product is loaded on the trays at a unit loading of 2 lbs./square foot, and with a total tray area of 500 square feet, the loaded car will contain 1,000 lbs. of frozen asparagus. The trays are supported on the shelves by insulating feet, as described, for radiant heating. The temperature of the frozen asparagus will be below freezing, say at 20° F., and before the loaded car is placed in the vacuum chamber, the refrigeration unit will have brought the temperature of the vapor condenser plates within the chamber to $-40°$ F. to $-50°$ F., and except during the peak load period at the start of the cycle, the plates are maintained substantially at this temperature throughout the drying portion of the cycle.

The cold glycol is purged from the car shelves, the loaded car is wheeled into the cold vacuum chamber, and the hot glycol solution hose connections are made. If desired, thermo-couples will have been embedded in the product at selected spots, and these will be plugged in when the car is in the chamber. The plug-in connections to the tray thermostat switches, previously described, are made, and the door is closed.

The large, or pumpdown, vacuum pump is now connected into the vacuum chamber and the vacuum is brought down to about 1 mm. of Hg in about 15 minutes. At this time, most of the air has been evacuated from the chamber. The car shelves are now filled with heated glycol solution, and the heated liquid is circulated as previously described, with which relatively rapid sublimation begins. The large vacuum pump continues to evacuate the chamber, but most of the air has been withdrawn and the pump is now removing the last of the air and any small quantities of non-condensed water vapor. After about 20-25 minutes' total elapsed time, the pressure in the chamber will have been brought down to 0.1 to 0.2 inch of Hg, at which time the vacuum valves are operated to disconnect the main vacuum pump and connect the holding vacuum pump to the chamber.

The thermostat switches on the product trays will have been set to turn the glycol heater off when the switches sense a temperature of 130° F. The temperature of the glycol solution will vary somewhat with the load, but will be maintained at a temperature in the order of 180° F. during an initial period of the cycle. As the ice core in the product is reduced, the temperature of the glycol solution will progressively drop under control of the tray thermostats.

If thermo-couples have been installed on the shelves, in the product, and on the trays, and if the corresponding temperatures are measured and recorded, it will be found that as the sublimation process continues, the shelf temperature slowly rises from about room temperature to the temperature of the glycol solution, the latter temperature being reached by the shelves after elapse of about ½ of the total drying time, depending on the capacity of the glycol heater.

The tray temperature drops at first, because of cooling of the product by sublimation as the vacuum is brought down, whereupon the tray temperature slowly rises and reaches 130° F., the control temperature. At about this time the shelves and the glycol solution temperature will be at a maximum. From this point on, the tray thermostats turn the heater on and off at intervals of increasing frequency, as previously described.

The product ice core temperature soon drops to the temperature corresponding to the vapor pressure in the chamber ($-40°$ F. to $-50°$ F.) and stays there during a large part of the drying cycle. Near the end of the drying cycle, the ice in the product has been almost completely sublimed, and the product temperature rises relatively rapidly until it almost reaches the tray temperature. Because of the difficulty in locating thermocouples in the product so that they will be precisely in the center of the last remaining ice core, and because the thermo-couple wires conduct heat to the ice core in which they were initially embedded, it is difficult to ascertain the true, or effective product temperature, as previously mentioned. This is the reason that control of the tray temperature, to insure that the product will be dried as rapidly as possible without scorching, is important. In the present example, drying is completed in about 18 hours.

After experience and instrumentation shows that the product is dry, the vacuum in the chamber is broken by the introduction of dry air or nitrogen in the conventional manner, and the door is opened. Suitable valves and piping (not shown) are provided for this purpose, in accordance with usual practice. The car with its dried product is wheeled into the dry or product unloading room, wherein it is purged of the heated glycol and unloaded. The dried product is placed in air tight containers, such as polyethylene bags, or nitrogen atmosphere cans.

As soon as the car with its dried product has been removed from the vacuum chamber, the refrigeration unit is disconnected and the chamber is defrosted and flushed out, as previously described. After the shelves have been defrosted, the refrigeration system is re-connected to the shelves of the chamber, and the shelves cooled, ready for the next car. A newly loaded car is then introduced into the vacuum chamber, and the previously unloaded car is wheeled into the cold room and its shelves are filled with refrigerated glycol solution. The trays are loaded and introduced into the car, the cold glycol solution is blown out of the car shelves, and the car is wheeled into another vacuum chamber of the system for another cycle of product drying.

Having completed a detailed description of the invention, it can be seen how the various features and advantages previously described can be attained. The invention having thus been described, what is believed to be new and desired to be protected by Letters Patent is:

1. A freeze drying system comprising a plurality of cylindrical vacuum chambers with horizontal axes, a door at one end of each chamber, turntable means at each door, car tracks running from the turntable means into the associated vacuum chambers, a car for each vacuum chamber, said cars having vertical sides, a car loading cold room, tracks connecting said cold room with said turntable means, a product unloading dry room, tracks connecting said dry room with said turntable means, said cars having hollow heating shelves, product trays on the shelves, means for circulating heating fluid through said car shelves while the cars are in their respective vacuum chambers, a set of spaced vapor condensing plates mounted in each chamber at each side of the car receiving space, the inner edges of said condensing plates lying substantially in vertical planes that are close to the sides of a car in the chamber, means for evacuating said chambers, and means for refrigerating said vapor condensing plates.

2. In a freeze drying system, a cylindrical vacuum chamber with a horizontal axis, a door at one end of said chamber, means for connecting the chamber to an evacuator, a set of vertically spaced, longitudinally extending vapor condensing plates mounted in said chamber at each side of the chamber, the plates in each set diverging from one another from their outer longitudinal edges to their inner longitudinal edges in a generally fan-shaped manner, the inner edges of the condensing plates in each set lying substantially in vertical planes, and header means for connecting said condensing plates to a source of refrigerant.

3. A freeze drying system comprising a plurality of vacuum chambers, a door at one end of each chamber, means for evacuating said chambers, a car for each chamber, turntable means at each door, car tracks running from the tuntable means into the associated vacuum chambers, a car loading cold room and a car unloading dry room, tracks connecting said rooms with said turntable means, said cars having hollow heating shelves, product trays on the shelves, a hot liquid storage tank, means for filling said car shelves with hot liquid from said tank and circulating the liquid through the car shelves while the cars are in their respective chambers, means for transferring the hot liquid from the cars to said hot liquid storage tank upon completion of the drying process, a storage tank for cold liquid, means for filling the previously emptied shelves of cars with cold liquid for loading of the cars with the product in said cold room, means for transferring the cold liquid from the loaded cars back to said cold liquid storage tank before the loaded cars are placed in their respective vacuum chambers, and refrigerated means in said vacuum chambers for condensing vapor sublimed from the product during heating of the product in the chambers.

4. A freeze drying system comprising a plurality of vacuum chambers, a door at one end of each chamber, means for evacuating said chambers, a car for each chamber, a car loading cold room and a car unloading dry room, said cars having hollow heating shelves, product trays on the shelves, a hot liquid storage tank, means for filling said car shelves with hot liquid from said tank and circulating the liquid through the car shelves while the cars are in their respective chambers, means for transferring the hot liquid from the cars to said hot liquid storage tank upon completion of the drying process, a storage tank for cold liquid, means for refrigerating the cold liquid, means for filling the previously emptied shelves of cars with cold liquid for loading of the cars with the product in said cold room, means for transferring the cold liquid from the loaded cars back to said cold liquid storage tank before the loaded cars are placed in their respective vacuum chambers, heat exchange means in said vacuum chambers for condensing vapor sublimed from the product during heating of the product in the chambers, a vapor condensing refrigeration unit including a compressor, means for conducting liquid refrigerant from said refrigeration unit to the heat exchange means in the associated chambers, and means for circulating hot compressed gaseous refrigerant from the compressor of said refrigeration unit through said heat exchange means of selected chambers to defrost the heat exchange means.

5. In a freeze drying system, a cylindrical vacuum chamber with a horizontal axis, a door at one end of said chamber, a set of vertically spaced, longitudinally extending vapor condensing plates mounted in said chamber at each side of the chamber, the plates in each set diverging from one another from their outer longitudinal edges to their inner longitudinal edges in a generally fan-shaped manner, said sets of plates each comprising an upper group the plates of which are inclined upwardly from their outer to their inner edges and a lower group the plates of which are inclined downwardly from their outer to their inner edges, the inner edges of the condensing plates of each set lying substantially in vertical planes, the planes being laterally spaced to receive a product loaded car, and means for refrigerating said condensing plates comprising liquid inlet risers, heater pipes connecting said inlet risers to the outer edges of said upper groups of plates and to the inner edges of said lower groups of plates, and outlet risers connected to the inner edges of said upper groups of plates and to the outer edges of said lower groups of plates.

6. A freeze drying system comprising a main room, a plurality of vacuum chambers in said main room, a door at one end of each chamber, a car for each vacuum chamber, a car loading cold room adjacent said main room, a car unloading dry room adjacent said main room, means for evacuating said vacuum chambers, said cars having hollow product heating shelves, product trays on the shelves, a hot liquid storage tank, means for circulating hot liquid through said car shelves while the cars are in their respective vacuum chambers to dry the product in the cars, means for transferring the hot heating liquid from the cars back to the hot liquid storage tank upon completion of the drying process, a storage tank for cold liquid, means for refrigerating the cold liquid, means for filling the previously emptied car shelves with cold liquid for cooling the product during loading of the cars in said cold room, means for transferring cold liquid from the loaded cars back to said cold liquid storage tank before the loaded cars are placed in their respective vacuum chambers, and refrigerated means in said vacuum chambers for condensing vapor subliming from the product being heated in the chambers.

7. In a freeze drying system, an elongate vacuum chamber, a door at one end of said chamber, means for connecting said vacuum chamber to an evacuator, a product carrier movable into and out of said chamber and having substantially vertical sides, said carrier having vertically spaced, horizontally disposed heating shelves extending substantially to the sides of the carrier, product trays removably mounted on the shelves and extending substantially to the sides of said carrier, means for connecting said carrier shelves to heating means while the carrier is in said vacuum chamber, and a vapor condensing unit mounted in said chamber at each side thereof, said vapor condensing units comprising a plurality of spaced, flattened refrigerant conducting elements, said flattened elements being disposed in the vacuum chamber so as to present their edges to said carrier for minimizing radiant heat transfer from the shelves and trays to the refrigerant conducting elements, said element edges lying in a substantially vertical plane that is close to the associated side of the carrier when the latter is in the chamber for minimizing the length of the vapor path between said trays and said refrigerant conducting elements.

8. A freeze drying system comprising a low pressure drying chamber, means for condensing vapor formed in said chamber, means for refrigerating said vapor-condensing means, a plurality of hollow product heating shelves in said chamber, liquid heating means, a pump for circulating a liquid heated by said liquid heating means through said shelves, metal product bearing trays of high heat conductivity, means for supporting a product loaded tray between each pair of adjacent product heating shelves, said tray supporting means mounting each tray in spaced relation to adjacent shelves for causing each tray to be primarily heated by radiant heat from the shelves and not by conduction, thermostat means for directly sensing the temperature of at least one of said trays in said drying chamber, and means connected to said thermostat means for controlling said liquid heating means to prevent the temperature of the product from reaching a temperature that is deleterious to the product near the end of the drying cycle.

9. A freeze drying system comprising a plurality of low pressure drying chambers, hollow cooling elements in said chambers, said cooling elements having refrigeration inlets and outlets, a refrigeration unit comprising a compressor and a condenser, a set of normal refrigeration lines for connecting the refrigeration inlets of said cooling elements for receiving refrigerant from said condenser, and for connecting the refrigeration outlets of said cooling elements to the inlet of said compressor; a set of defrost lines for connecting the refrigeration inlets and outlets of said hollow cooling elements between the outlet of said compressor and the inlet of said condenser; valve means in said sets of normal refrigeration lines and in said defrost lines, said valve means being set for connecting the hollow cooling elements of certain of said drying chambers into said refrigeration lines betweens the condenser outlet and the compressor inlet for drying; said valve means also being set for connecting the hollow cooling elements of one of said drying chambers into said defrost lines and between the outlet of said compressor and the inlet of said condenser for defrosting; the resulting circuit being such that the outlet of said compressor, the drying chamber being defrosted, the condenser, the drying chambers being refrigerated, and the inlet of said compressor are all connected in series, and in the sequence named, the cooling elements of the drying chamber being defrosted providing the sole passageway for refrigerant that passes through the condenser and for refrigerant that passes through said certain drying chambers for drying; means for maintaining said certain drying chambers at subatmospheric pressure, means for loading the frozen product into said certain drying chambers, and means for heating the frozen product in the latter drying chambers.

10. A freeze drying system comprising a plurality of vacuum chambers with horizontal axes, a door at one end of each chamber, turntable means at each door, car tracks running from the turntable means into the associated vacuum chambers, a car for each vacuum chamber, said cars having vertical sides, a car loading cold room, tracks connecting said cold room with said turntable means, a product unloading dry room, tracks connecting said dry room with said turntable means, said cars having hollow heating shelves, product trays on the shelves, means for circulating heating fluid through said car shelves while the cars are in their respective vacuum chambers, a set of spaced vapor condensing plates mounted in each chamber at each side of the car receiving space, the inner edges of said condensing plates lying substantially in vertical planes that are close to the sides of a car in the chamber, means for evacuating said chambers, and means for circulating refrigerant through said vapor condensing plates.

References Cited in the file of this patent

UNITED STATES PATENTS

| | | |
|---|---|---|
| 1,625,548 | Kobiolke | Apr. 19, 1927 |
| 2,141,715 | Hilger | Dec. 27, 1938 |
| 2,362,117 | David | Nov. 7, 1944 |
| 2,389,452 | Patterson | Nov. 20, 1945 |
| 2,453,033 | Patterson | Nov. 2, 1948 |
| 2,587,485 | Kline | Feb. 26, 1952 |
| 2,858,795 | Walker | Nov. 4, 1958 |